May 12, 1964  N. K. MILLER  3,133,167
SAFETY EDGE FOR POWER OPERATED DOOR
Filed April 6, 1961
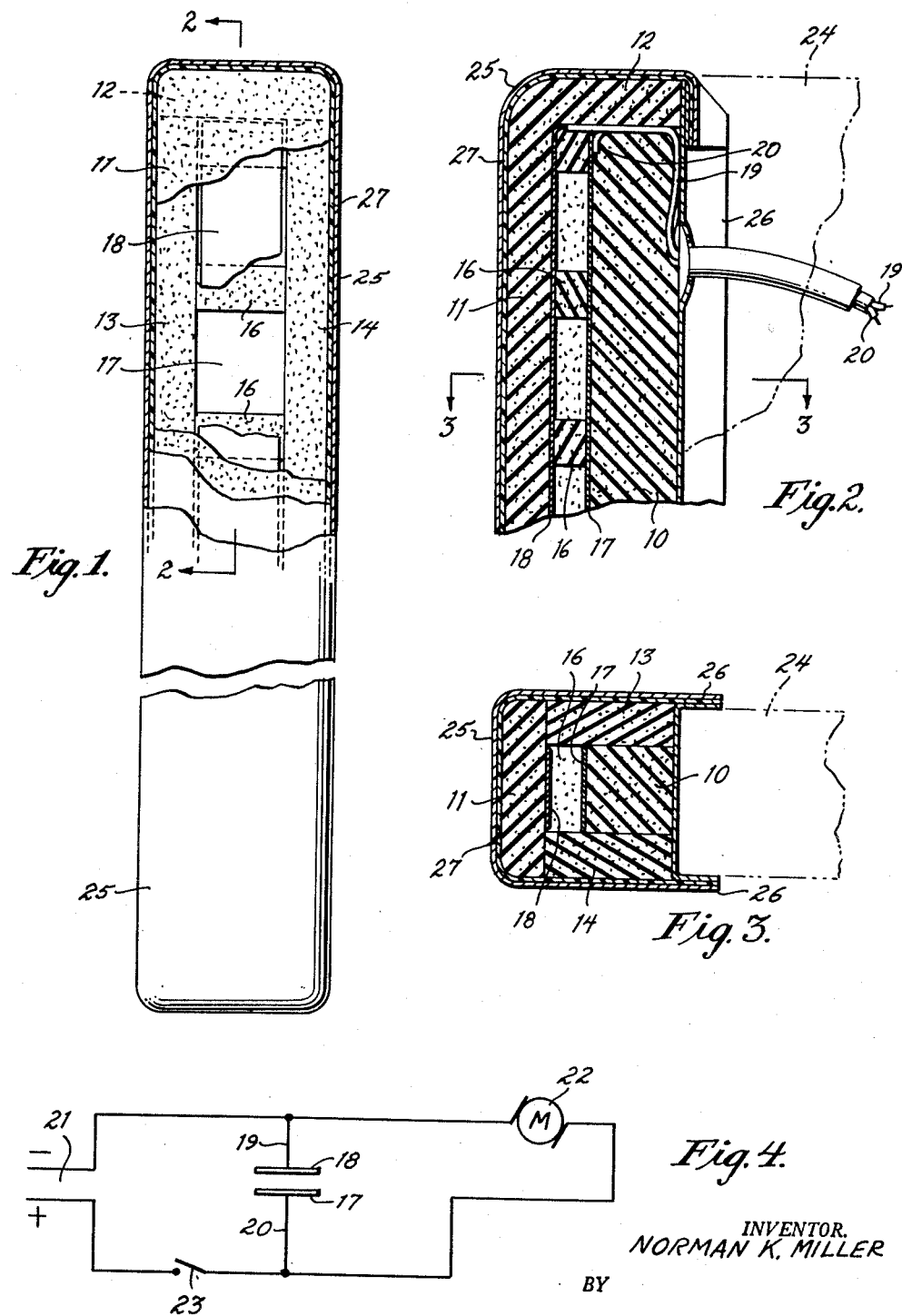
INVENTOR.
NORMAN K. MILLER
BY
ATTORNEY.

United States Patent Office 3,133,167
Patented May 12, 1964

3,133,167
SAFETY EDGE FOR POWER OPERATED DOOR
Norman K. Miller, Havertown, Pa., assignor to Miller Brothers, Upper Darby, Pa., a partnership
Filed Apr. 6, 1961, Ser. No. 101,150
1 Claim. (Cl. 200—61.43)

The present invention relates to a safety edge for a power operated door and is concerned primarily with certain improvements over the safety edge disclosed in Patent No. 2,843,690, dated July 15, 1958.

In the patent aforesaid, a pair of contact strips are mounted in a foam rubber structure in confronting spaced relation. When the safety edge engages an object in the path of movement of the door on which it is mounted, the foam rubber is deformed to bring the contact strips into engagement and thus, disable the operating motor. Obviously, when the distorting effect of the obstructing object is removed, the edge is intended to return to its original position in which the contact strips are spaced apart.

It has been found from practical experience that the safety edge of the patent above identified is not sufficiently crush resistant, that is, after continued use and repeated engagements with obstructing objects. The foam rubber of the structure will not return to its original construction to the extent required to insure that the contact strips are properly spaced. For this reason, a highly important object of the invention is to provide a safety edge for a power operated door which is highly crush resistant and which affords definite assurance that the contact strips will remain properly spaced apart after repeated usage.

More in detail, the invention has as an object, the provision of a safety edge of the character aforesaid which consists essentially of a foam rubber base and a complemental U-shaped foam rubber member having a back, the inner face of which is spaced from the base. The confronting spaced faces of the base and back are provided with contact strips and in accordance with this invention, crush resistant members in the form of cross pieces of foam rubber are interposed between the back and base. These cross pieces are, of course, subject to being deformed when the safety edge strikes an obstructing object and to the extent necessary to achieve contact between the contact strips. However, after the obstructing object is removed, these cross pieces exhibit a tendency to return to their original condition and thus insure that the contact strips are properly spaced.

In the above identified patent, the foam rubber structure is encased in a fabric that is impregnated with a plastic such as nylon. This fabric has the function, among others, of preventing moisture from entering into the interior and particularly in the space between the contact strips where it will engage the latter. It has been found that an impregnated fabric strip alone does not perform this moisture sealing function to the degree of perfection desired. Thus, another highly important object in view is to provide a safety edge for a power operated door which includes the foam rubber structure carrying the contacts and a plastic impregnated fabric casing with a lining of water proof material such as one of the synthetic plastics interposed between the casing and the foam rubber. This lining supplements the moisture sealing function of the casing and affords definite assurance that moisture will not get into the interior of the edge structure.

Various other more detailed objects and advantages of the invention such as arise in connection with carrying out the above noted ideas in a practical embodiment will in part become apparent and in part be hereinafter stated as the description of the invention proceeds.

The invention therefore comprises a safety edge for a power operated door consisting essentially of a crush resistant foam rubber structure including a base, a complemental U-shaped member having a back spaced from the base with the confronting faces of the base and back carrying contact strips and cross pieces of foam rubber between the said back and base, together with a plastic impregnated fabric casing and a moisture proof lining between the casing and the foam rubber structure.

For a full and more complete understanding of the invention, reference may be had to the following description and accompanying drawing wherein:

FIGURE 1 is an end view, partly in section and partly in elevation, of the approved safety edge of this invention.

FIGURE 2 is a partial section normal to FIGURE 1. and taken about on the plane represented by the line 2—2 of FIGURE 1.

FIGURE 3 is a horizontal section taken about on the plane represented by the line 3—3 of FIGURE 2 and FIGURE 4 is a wiring diagram of one circuit which may be employed and shown as including the contact strips.

Referring now to the drawing wherein like reference characters denote corresponding parts, the safety edge of this invention is shown as including a base 10 of foam rubber. Cooperating with the base 10 is a complemental U-shaped member made up of a back 11 and ends 12 integrally joined to the back 11. It will be noted that the base 10 and back 11 have faces in confronting spaced relation. Extending between the ends 12 and interposed between the base 10 and back 11 are side strips 13 and 14. These side strips are provided for their structure effect in maintaining the spaced relation and also serve to narrow the exposed area of the confronting faces.

Extending between the side strips 13 and 14 in the space between the confronting faces of the base 10 and back 11 are a plurality of cross strips 16. These cross strips 16 are spaced apart at appropriate intervals to provide the desired structural effect which is to be created in order to achieve the necessary crush resistant properties.

Mounted on the exposed or confronting faces of the base 10 is a contact strip 17 and a similar contact strip 18 is mounted on the inner or confronting faces of the back 11. These contact strips may be of the type disclosed in the patent aforesaid. It will be noted that the strip 18 has connected thereto, an electrical line 19, while another electric wire 20 is connected to the strip 17. As shown in FIGURE 4, the wires 19 and 20 are included in an electric circuit which also includes a power source such as represented at 21, an operating motor at 22 and a control switch at 23. It is evident that any time the contact strips 17 and 18 come into engagement, the motor is short circuited. Obviously, this is only one example of an electric circuit which may be employed.

It is intended that the foam rubber structure be mounted on the edge of a door which is represented in phantom at 24, in FIGURE 2. To achieve this mounting and also to maintain the assembled relation, a fabric casing 25 is employed. This casing 25 completely envelops the foam rubber structure with the exception of the face which engages the door. The fabric casing 25 also includes flaps at 26 which may be utilized in anchoring the edge structure in position on the door.

The casing 25 is preferably an appropriate fabric that is impregnated with a plastic so as to impart water proof properties thereto. Interposed between the casing 25 and the foam rubber structure is a lining 27 of a plastic having moisture proof properties. These moisture proof properties of the lining supplement the same qualities of the casing to provide definite assurance that moisture will not enter into the space betwen the confronting faces of the base and back.

Operation

While the manner in which the safety edge of this invention operates is believed to be obvious from the illustrations of the drawing, and description of parts given, it may be briefly outlined by noting that when the door 24 is to be power operated, the switch 23 is closed to energize the motor 22. Any time the edge encounters an object in the path of movement of the door, the obstruction will cause the U-shaped member 11—12, side pieces 13—14, and cross pieces 16 to deform and become distorted to the extent in which some areas of the contact strips 17 and 18 will be brought into engagement. This short-circuits and disables the motor 22. However, when the obstruction is removed, the inherent tendency of the foam rubber structure to return to its original condition will again restore the spacing between the contacts and enable the motor to operate the door in the usual manner.

While a preferred specific embodiment of the invention is hereinafter set forth, it is to be clearly understood that the invention is not to be limited to the exact construction, designs and mechanisms illustrated and described because various modifications of these details may be provided in putting the invention into practice within the purview of the appended claims.

What is claimed is:

In a safety edge for power operated door, an elongated foam rubber base having ends, sides, and an exposed face, a complemental foam rubber U-shaped member having legs overlapping the ends of said base and a back with an inner face spaced from and confronting the exposed face on said base, contact strips on said faces, foam rubber side pieces between said faces along the sides, a plurality of equidistantly spaced apart foam rubber cross strips extending between said side pieces and disposed between said faces, each of said cross strips spanning the distance between said side pieces, a fabric casing about said base and U-shaped member and including marginal portions for mounting said foam rubber structure on the edge of a door and a moisture proof lining interposed between said casing and said foam rubber structure.

References Cited in the file of this patent

UNITED STATES PATENTS

| | | |
|---|---|---|
| 1,950,490 | Geer et al. | Mar. 13, 1934 |
| 2,135,131 | Bassett | Nov. 1, 1938 |
| 2,440,943 | Gonsett et al. | May 4, 1948 |
| 2,728,827 | Towle | Dec. 27, 1955 |
| 2,740,856 | Doeg | Apr. 3, 1956 |
| 2,780,693 | McClellan | Feb. 5, 1957 |
| 2,843,690 | Miller | July 15, 1958 |
| 2,954,446 | Wikkerink | Sept. 27, 1960 |